March 19, 1963 J. W. WATSON 3,082,319
RESISTANCE HEATING

Filed Sept. 25, 1961 7 Sheets-Sheet 2

INVENTOR.
JOHN W. WATSON
BY
Wallace, Kinzer & Horn
ATT'YS.

INVENTOR.
JOHN W. WATSON
BY
Wallace, Kinzer & Dorn
ATT'YS.

March 19, 1963

J. W. WATSON 3,082,319

RESISTANCE HEATING

Filed Sept. 25, 1961

INVENTOR.
JOHN W. WATSON
BY
Wallace, Kinzer & Dorn
ATTYS.

March 19, 1963 J. W. WATSON 3,082,319
RESISTANCE HEATING
Filed Sept. 25, 1961 7 Sheets-Sheet 5

INVENTOR.
JOHN W. WATSON
BY
Wallace, Kinzer & Horn
ATT'YS

March 19, 1963 J. W. WATSON 3,082,319
RESISTANCE HEATING
Filed Sept. 25, 1961 7 Sheets-Sheet 7

INVENTOR.
JOHN W. WATSON
BY
Wallace, Kinzer & Horn
Attys.

United States Patent Office 3,082,319
Patented Mar. 19, 1963

3,082,319
RESISTANCE HEATING
John W. Watson, Rockford, Ill., assignor to American Brake Shoe Company, New York, N.Y., a corporation of Delaware
Filed Sept. 25, 1961, Ser. No. 140,394
6 Claims. (Cl. 219—156)

This invention relates to a new and improved industrial resistance heating system and more particularly to a resistance heating apparatus suitable for heating billets to working temperature for a forging operation.

In conventional forging and other hot metal-working operations, a billet that is to be forged, upset, or otherwise hot worked is first heated to a relatively high temperature, usually just short of the melting temperature of the billet. Usually, this is done in a furnace; however, there have been proposals for direct electrical heating of the billets and also for induction heating thereof. One system for direct resistance heating of billets is described and claimed in the co-pending application of Stanley J. Vickers, Serial No. 813,143, filed May 14, 1959, and entitled "Method and Apparatus for Forging." As pointed out in the Vickers application, direct resistance heating eliminates a number of problems relating to scale on the billets, uniformity of heating, time required for heating, and the like. On the other hand, the apparatus described in that application is directed primarily to individual heating of the respective billets.

In an application in which relatively large quantities of forgings are manufactured, the burden imposed on the electrical capacity of a manufacturing plant, in a system providing for individual heating of billets, may be prohibitive. Consequently, it may be essential to provide for the simultaneous heating of a plurality of billets in an arrangement which affords a steady flow of heated billets for the forging equipment. This can be accomplished by apparatus which effectively places a plurality of billets in parallel with each other in an electrical heating apparatus, but an arrangement of this kind may produce very high current surges, the current variations being so large as to be most difficult to control. Furthermore, a parallel heating arrangement requires a very large capacity, with respect to the electrical current drawn on an instantaneous basis. A series arrangement, on the other hand, may present substantial problems with respect to switching and arcing at points where contact is made with the billets.

It is an object of the present invention, therefore, to provide a new and improved resistance heating apparatus, suitable for use in heating billets to forging temperature and in like applications, that permits the heating of relatively large quantities of billets or other workpieces in a minimum time.

Another object of the invention is to achieve maximum use of the electrical capacity of a resistance heating apparatus to heat billets for forging and for similar applications.

Another object of the invention is to reduce arcing, heating, contact welding, and other electrical difficulties in a high-current-density resistance heating apparatus. This is accomplished, in the present invention, by utilization of a modified form of series heating arrangement.

A further object of the invention is to afford a resistance heating apparatus suitable for industrial applications entailing large currents, such as in the heating of billets to forging temperature, which inherently exhibits a low inductance in operation, and, consequently, affords a relatively high power factor.

An additional object of the invention is to afford a resistance heating apparatus for heating billets to forging temperature, and for like applications, that is inherently simple and inexpensive in construction yet highly efficient in operation.

A resistance heating apparatus constructed in accordance with the invention comprises a plurality of sets of electrodes each effective to engage a billet or other workpiece at spaced points to pass a large heating current therethrough. Electrical connector means are employed to connect a predetermined number of the sets of electrodes in series with each other across a power supply. The series circuit is not completed by the electrodes per se, but requires the presence of billets or other workpieces engaging the electrodes to afford a complete series connection. The heating apparatus further includes means for automatically shunting any given set of electrodes, when the workpiece engaged thereby has reached forging temperature, to permit removal and replacement of the workpiece without interrupting the heating of other workpieces by the remaining sets of electrodes.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figure 1:
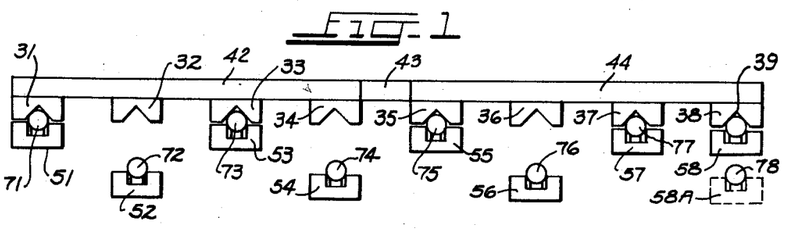
FIG. 1 is a schematic elevation view of a resistance heating apparatus constructed in accordance with one embodiment of the present invention.
Figure 2:
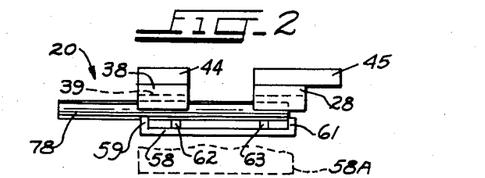
FIG. 2 is a simplified end elevation view of the apparatus of FIG. 1.
Figure 3:
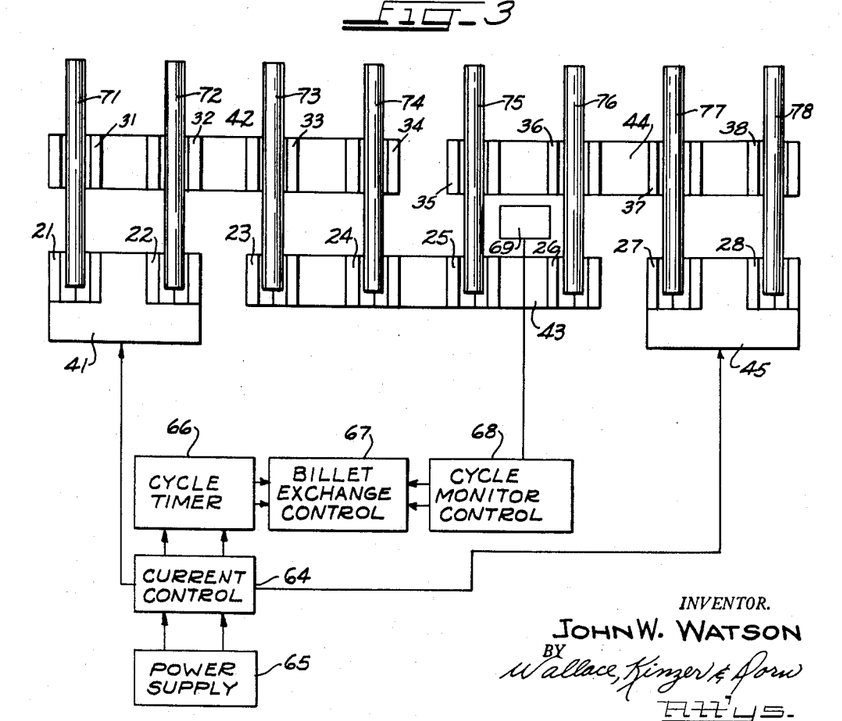
FIG. 3 is a schematic representation of the system of FIG. 1, comprising essentially a bottom view, illustrating additional schematic control apparatus.

FIGS. 1–3 illustrate a resistance heating apparatus 20 that may be employed for heating of billets in forging operation, or in other similar applications requiring relatively rapid high temperature heating of metal workpieces. The resistance heating apparatus 20 comprises eight sets of electrodes, each set including two electrodes. The first set of electrodes (see FIG. 3) comprises the electrodes 21 and 31 appearing at the left-hand side of the figure. The final set of electrodes, at the far right-hand side of the figure, comprises the electrodes 28 and 38. As shown in FIGS. 1 and 2, each of the individual electrodes comprises a V-shaped contact portion for engaging a billet or other workpiece. Thus, the electrode 38 affords a V-shaped recess 39 for receiving a billet 78. The configuration of the electrode 28 is similar, and it too engages the billet 78, as illustrated in FIG. 2.

The electrical connection arrangement for the electrodes is best illustrated in FIG. 3. As shown therein, the electrodes 21 and 22 are connected together electrically by means of a bus bar 41. The electrodes 31–34 are electrically connected by a bus bar 42. A bus bar 43 connects the electrodes 23–26 together, a bus bar 44 interconnects the electrodes 35–38, and the electrodes 27 and 28 are connected by a bus 45. It is thus seen, from FIG. 3, that the electrodes sets are connected in series by pairs. That is, starting at the bus bar 41 in the lower left-hand corner of FIG. 3, the first set of electrodes 21, 31 is connected in parallel with the second set 22, 32 and in series with the third set 23, 33. The third set of electrodes, in turn, is connected in parallel with the fourth set 24, 34 but in series with the next pair of electrodes sets, the fifth set 25, 35 and the sixth set 26, 36. The circuit is completed by the series connection therein of the final pair of electrode sets, the sets 27, 37 and 28, 38.

As will be apparent from the drawings and from the foregoing description, the electrodes do not themselves complete an electrical circuit. Rather, they are merely positioned in alignment with each other and arranged for completion of an electrical circuit upon engagement of a series of billets in the electrodes. To mount the billets in the electrodes, it is necessary to provide a series of billet holders or pressure members shown in FIG. 1 as the members 51 through 58. The actual construction and configuration of the members 51–58 is not critical, insofar as the basic system is concerned, although preferred structural arrangements are described hereinafter in connection with FIGS. 4–9. For consideration of the basic system, it is sufficient to consider that each of the pressure members 51–58 is capable of holding a billet, such as the billet 78, and can be employed to move the billet between a retracted "ready" position 58A displaced from the associated set of electrodes 28, 38, and a heating position in which the billet engages the electrodes.

As shown in FIG. 2, the pressure member 58 may include two or more guide members, such as a front guide 59 and a rear stop or guide 61, together with a pair of pressure contact members 62 and 63 for applying upward pressure to the billet 78. In the preferred system described hereinafter, the billet holder 58 actually comprises two individual pressure applying and support assemblies, but the illustrated unitary construction of FIG. 2 can be utilized if desired. In FIGS. 1 and 2, the pressure member 58 is shown in solid lines at its heating position, holding the billet 78 in contact with the electrode set 28, 38. The ready or loading position for the support and pressure member 58 is indicated by the phantom outline 58A.

The electrical system for the resistance heating apparatus 20 of FIGS. 1–3 is illustrated in FIG. 3 in block diagram form. It comprises a main control circuit 64 that connects the two end buses 41 and 45 of the heating system to a power supply 65. Generally speaking, the current control unit 64 may include a step-down transformer, capable of handling relatively large currents, and suitable switch means for opening and closing the electrical connection to the end buses 41 and 45 of the heating apparatus. The electrical control system further includes a cycle timer 66 connected to the control unit 64. The timer 66 is also connected to a billet exchange control unit 67, the exchange control unit 67 further being connected to a monitor control unit 68. The monitor control unit 68 is electrically connected to a heat sensing device 69 arranged to sense the temperature of one billet in the heater system, in this instance the billet that would be engaged in the contact pair 25, 35.

In considering the operation of the heating system 20, it may first be assumed that all of the billet support devices 51–58 are moved to the "ready" position, as illustrated by the positions of the support members 52, 54 and 56 as well as the position 58A for the support and pressure member 58. Eight billets are then loaded in the support and pressure members. The support and pressure members 51, 53, 55 and 57 are then moved upwardly to the heating position, as shown in FIG. 1, engaging the billets supported in these members with the aligned sets of electrode. This places the billets 71, 73, 75 and 77 in heating position and leaves the billets 72, 74, 76 and 78 in the ready position. With reference to FIG. 3, it will be seen that this completes an electrical circuit from the control unit 64 through the bus 41, the billet 71, the bus 42, the billet 73, the bus 43, the billet 75, the bus 44, the billet 77, and the bus 45 back to the control unit 64. Accordingly, the four billets 71, 73, 75 and 77 are resistance heated in the above-described series circuit.

When the billet 77 reaches the desired working temperature, as determined by the cycle control described more fully hereinafter, it is necessary to remove this billet and send it to the forging press or other metal-working equipment with which the heating system 20 is coordinated. To accomplish this end, the pressure and support member 58 is first moved upwardly from the position 58A to the heating position in which the billet 78 is engaged in firm electrical contact with the two contact members 28 and 38. This places the billet 78 in shunt relation to the billet 77. Consequently, it is now possible to lower the support member 57 and disengage the billet 77 from the heating circuit without interrupting operation of the series circuit. When this is done, the billet 77 is removed from the support and pressure member 57, and a new cold billet is loaded in the support and pressure member 57. Consequently, the billet is ready, in the member 57, to be brought into shunt relation to the billet 78 when this billet has completed its heating cycle and requires removal from the heating system.

The object of the system 20 is to afford a substantially continuous flow of heated billets to a forging or other metal-working apparatus. Consequently, it is usually undesirable to have all of the first four billets reach the forging or working temperature at one time, requiring replacement and discharge of all four of these billets simultaneously. When the system is first placed in operation, three of the billets may be removed before they are completely heated, at spaced intervals during the heating time required to bring the fourth billet up to working temperature. By way of an example, it may be decided that the first billet to be brought to forging temperature will be the billet 77. If the heating time required is of the order of sixty seconds, the first billet 71 may be removed and replaced in the electrical circuit by the billet 72, in the manner described hereinabove, after fifteen seconds in the initial heating cycle of the apparatus. The billet 73 would be replaced by the billet 74, in the electrical circuit, and would be removed from the heating apparatus, after thirty seconds. The billet 75 would be removed and replaced by the billet 76 after forty-five seconds. The billet 77 could then be removed, as the first billet actually heated to a forging temperature, after the required sixty seconds in the heating system. Fifteen seconds thereafter, the billet 72 would reach forging temperature, and would be replaced by the billet 71, or rather by a cold billet mounted in the holder 51 and moved to the position shown in the drawings for the billet 71. It is thus seen that the heating apparatus 20 can easily be regulated to afford a substantially continuous flow of heated metal workpieces.

To afford semi-automatic operation of the system of FIGS. 1–3, a timing apparatus may be utilized to control the movements of the support and pressure members between their heating positions and their ready or loading positions. Thus, suitable means may be provided to actuate the support and pressure members 51–58 in timed sequence under the control of a suitable timing apparatus indicated in FIG. 3 as the cycle timer 66. This timing apparatus could take any one of the wide variety of forms, and one example of suitable timing equipment is described hereinafter in connection with FIG. 10. The timer itself may be provided with an adjustable exchange control, indicated generally in FIG. 3 by the control unit 67. Preferably, provision is made to alter the cycling operation of the control unit in response to direct sensing of the temperature at at least one of the heating positions as indicated by the sensing element 69 and the monitor control unit 68. On the other hand, individual automatic control arrangements can be utilized with each pair of electrode sets (e.g. electrode sets 21, 31 and 22, 32) as desired. Individual thermal controls, however, may add quite substantially to the expense of the heating system.

The series heater system of FIGS. 1–3 affords a very substantial advantage as compared with an individual heating system or a parallel heating system for simultaneous heating of a plurality of workpieces. Thus, to achieve the same output rate with a single billet heater, the current density must be much higher in the single heater than in the series system of the present invention. In fact, the working current requirement in a single billet heater, as compared with the illustrated system, would be about twice as great. Furthermore, it will be apparent that the present invention is not limited to the use of four paired sets of electrodes in the series arrangement and that this factor could be even greater. The conventional single billet heater would require shutting down for at least some time interval during each heating cycle, resulting in appreciable lost time. As a consequence, the efficiency of use of the heating equipment is markedly increased in the series heating system of the present invention as compared with an individual heating device. On the other hand, the series system provides inherently better power factor of the heating system, considered as a whole, and reduced current surges as compared with a parallel heating system or individual heating apparatus having a comparable capacity in number of billets heated per time interval. Because each billet is relatively low in resistance at the time that it is incorporated in the heating circuit, the current always rises when a new billet is placed in the heater. With the billets connected in series, however, the change in total resistance of the heating circuit is relatively small when replacement of one billet occurs. This is quite different from the parallel circuit arrangement, where the lowest resistance billet effectively determines the total resistance of the heating system and, accordingly, determines the current that flows through the system. Thus, each replacement of a billet in a parallel heating system produces a substantial current surge, a condition that is effectively mimimized with the present invention.

The series system of the present invention reduces the need for large-capacity starting and switching equipment. It effectively eliminates arcing, due to the insertion of the new or cold billets into the circuit prior to removal of the heated billets. Furthermore, it makes it possible to provide a high rate of billet output despite utilization of a heating cycle of moderate length, which has been found to be desirable to avoid hot spots or inadequately heated areas in the billets. That is, the longer cycle time permitted by the system of the invention allows the natural thermal conductivity of the billets to take care of discontinuities in the direct electrical heating thereof.

Figure 4:
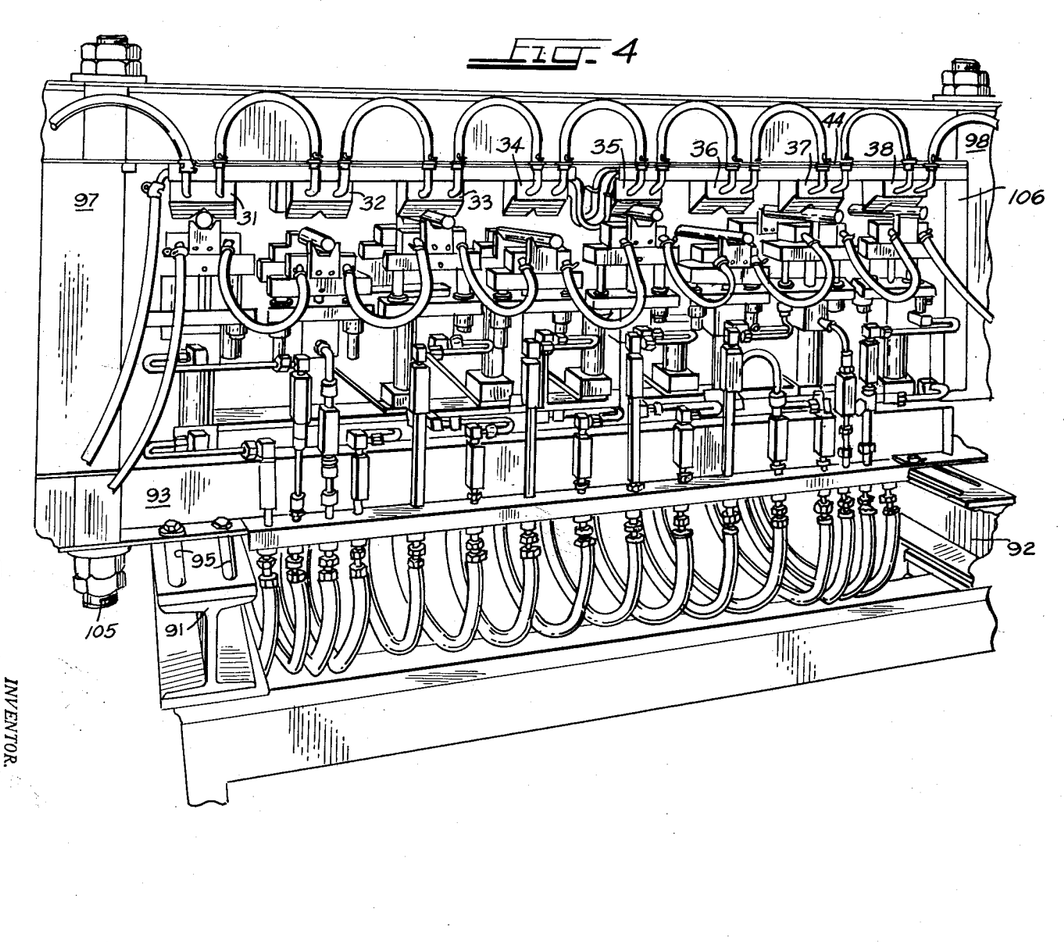
FIG. 4 is a perspective view of a billet heater incorporating the system of FIGS. 1–3 in a practical apparatus.
Figure 5:
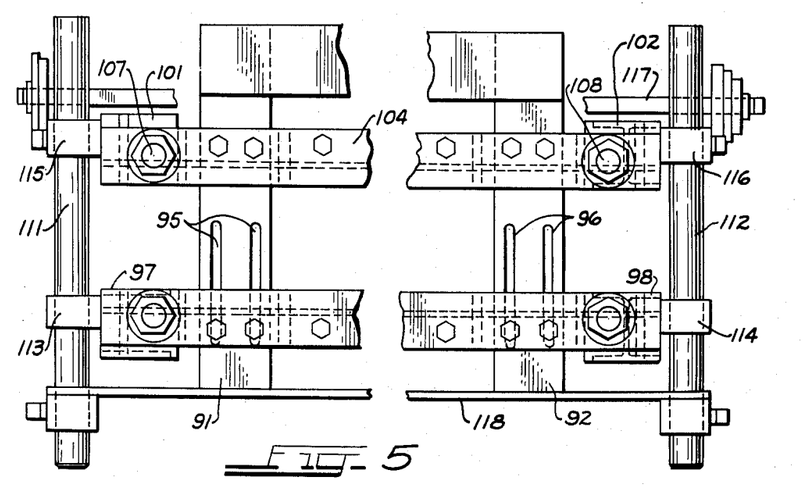
FIG. 5 is a plan view illustrating a portion of the apparatus of FIG. 4.

FIGS. 4 through 9 illustrate the mechanical construction of a practical embodiment of the heating apparatus 20 of FIGS. 1–3. As shown in FIGS. 4–8, the billet heating apparatus may comprise a main frame including two transverse frame members 91 and 92. Upon the frame members 91 and 92 there are mounted two longitudinal frame members 93 and 94 (see FIGS. 6, 7 and 8), the frame member 93 being located at the front or loading end of the machine and the frame member 94 being located at the rear end of the heating apparatus. The longitudinal frame member 94 at the rear of the machine is fixedly mounted on the two transverse frame members 91 and 92, whereas the frame member 93 is slidably mounted on the two transverse frame members by means of the slot mounting arrangement comprising the mounting slots 95 and 96 in the frame members 91 and 92, respectively, as shown in FIG. 5.

A pair of vertical frame members 97 and 98 are mounted at the opposite ends of the I-beam 93, and these vertical frame members support a longitudinal frame member 99 that extends above and is parallel to the frame member 93. Similarly, the frame at the rear of the machine is completed by a pair of vertical end posts 101 and 102 mounted at the ends of the frame member 94 and extending upwardly to afford a support for the parallel longitudinal frame member 104. A pair of heavy vertical bolts 105 and 106 are employed to hold the frame members 93, 97, 98 and 99 in a rigid rectangular configuration, affording the front frame for the heating apparatus. Similarly, a pair of vertically extending bolts 107 and 108 hold the frame members 94, 101, 102 and 104 in a rigid frame at the rear of the heating apparatus.

To adjust the spacing between the front and rear frames, a pair of rack members 111 and 112 are mounted on the opposite sides of the machine. Each of the two rack members is affixed to the front frame of the machine, specifically to the vertical members 97 and 98. The mounting means employed comprises a pair of brackets 113 and 114 mounted on the vertical support members 97 and 98 respectively, with suitable set screws being utilized to affix the frame at predetermined longitudinal positions along the two rack members. The rack members are similarly supported in a pair of brackets 115 and 116 mounted on the rear frame vertical support members 101 and 102, respectively. The two racks are engaged by suitable pinion gears (not shown) mounted upon a common shaft 117 that extends across the back of the machine. Thus, rotation of the shaft 117 is used to drive the front frame of the machine forward and back relative to the rear frame to increase and decrease the spacing between the front and rear frames. At the front of the machine, a transverse support bar 118 may be mounted to help support the billets during heating, but this is not essential.

FIG. 4, a perspective view taken from the front of the machine, shows the complete line-up of billet heating stations with the billets in the same positions as in FIG. 1. For a detailed illustration of the construction employed for one of the billet holders, however, reference may be had to FIGS. 6, 8 and 9, which show a complete billet support and pressure apparatus 158 that serves the same purpose as the billet holder 58 described hereinbefore in connection with FIGS. 1 and 2.

Figure 6:
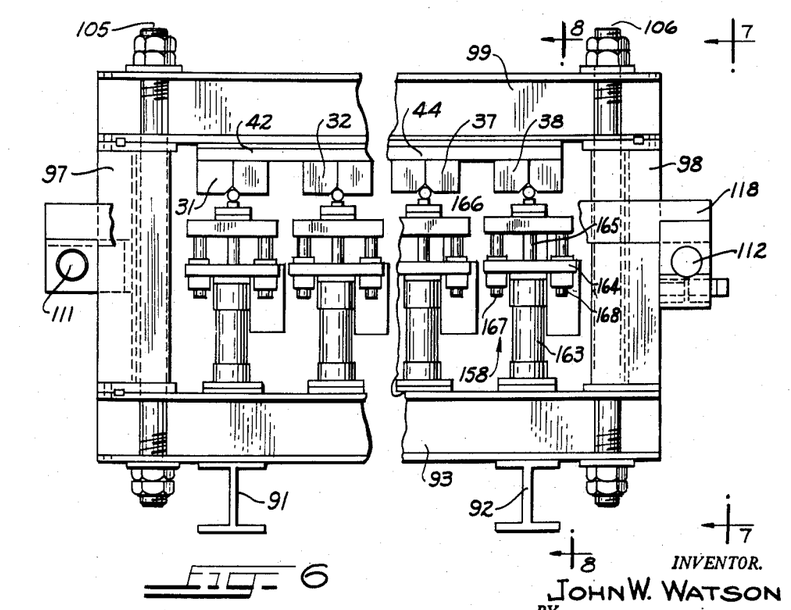
FIG. 6 is an elevation view of a part of the heater apparatus of FIG. 4.
Figure 7:
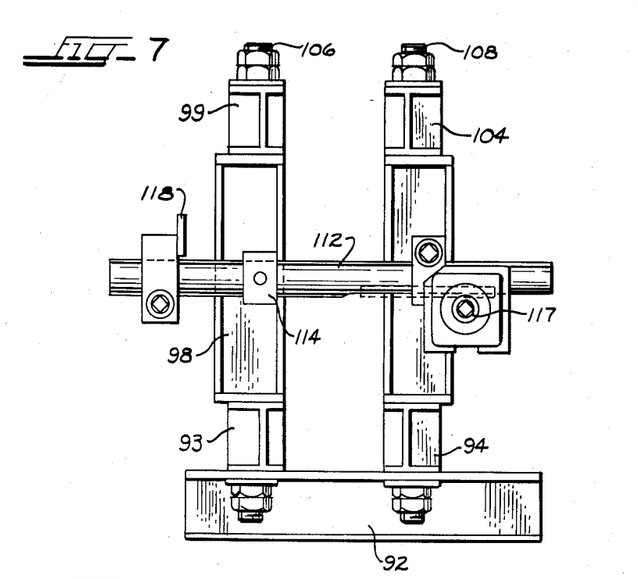
FIG. 7 is an end view taken approximately as indicated by line 7—7 in FIG. 6.
Figure 8:
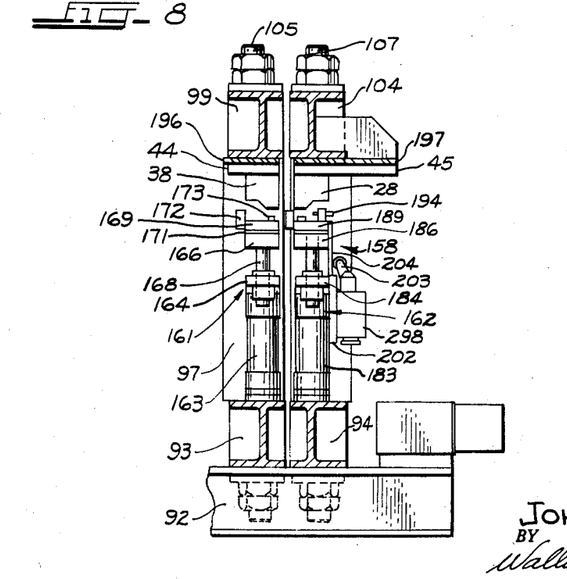
FIG. 8 is a sectional view taken approximately along line 8—8 in FIG. 6.

The billet holder 158 includes a front pressure-applying assembly 161 and a rear pressure-applying assembly 162. The front assembly 161 comprises a hydraulic cylinder 163 mounted upon the longitudinal frame member 93, as best shown in FIGS. 6 and 8. At the top of the cylinder 163 there is mounted a base plate 164 through which the piston rod 165 extends. The piston rod 165 supports an upper bearing plate 166 to which a pair of guide rods 167 and 168 are affixed. The guide rods 167 and 168 extend downwardly from the bearing plate 166 through suitable guide cylinders mounted on the base plate 164, affording a means for guiding a movement of the bearing plate 166 relative to the fixed base plate 164. On the bearing plate 166 there is mounted a support plate 169 that is electrically and thermally insulated from the bearing plate 166 by a suitable insulator member 171. At the front of the assembly, a guide bracket 172 is mounted upon the support plate 169, this guide bracket being utilized to support a billet in position above the support plate 169.

Figure 9:
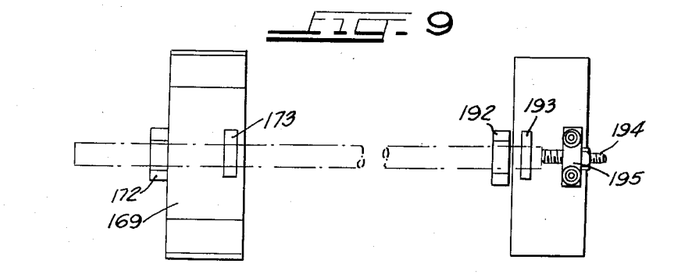
FIG. 9 is an enlarged detail view of the pressure applying devices used to effect electrical contact in the apparatus of FIGS. 4–8.

A pressure member 173 is affixed to the support plate 169 in spaced relation to the bracket 172; it is the pressure member 173 that exerts the upward force on the billet that presses the billet into intimate contact with the overhead electrical contact member 37 (see FIGS. 8 and 9).

The rear support assembly 162 is substantially similar to the front assembly 161 in many respects. Thus, it comprises a hydraulic cylinder 183 that supports a base plate 184 used to guide the vertical movements of a bearing plate 186, the bearing plate 186 being supported upon the piston rod from the cylinder 183 and being guided by suitable guide rods arranged in the same manner as in the previously described assembly 161. The bearing plate 186 has mounted thereon a support plate 189 that carries a guide bracket 192 and a pressure member 193 (see FIG. 9). In addition, the support plate 189 carries an adjustable stop comprising a set screw 194 threaded into a bracket 195 mounted upon the support plate 189. As before, it is the pressure member 193 that exerts the upward force on the billet, driving it into intimate contact with the electrode 27. The stop member 194 affords a convenient means for locating the end of the billet in relation to the pressure member 193. Of course, suitable precautions must be taken with respect to insulating the frame from the electrical heating circuits. Thus, for example, the buses 44 and 45 (FIG. 8) are spaced from the frame members 99 and 104 on which they are mounted by suitable thermal and electrical insulator members 196 and 197 respectively. Other insulator members are utilized where required.

The rear support assembly 162 further includes a limit switch 298 that is mounted upon a mounting plate 202 secured to the base plate 184. The limit switch 298 includes a sensing arm 203 that engages a cam plate 204, the cam plate 204 being secured to the upper assembly comprising the bearing plate 186.

The basic operation of the mechanical construction illustrated in FIGS. 4–9 is essentially that described in connection with the schematic illustration of Figs. 1–3. In placing the billets in position, the two cylinders associated with the support apparatus at any given heating position, such as the cylinders 163 and 183 for the support and pressure apparatus 158, are actuated to lower the two billet support assemblies. A billet can then be placed in position, from the front of the machine, which would be from the left as seen in FIG. 8. The billet is guided into position by the brackets 172 and 192, the longitudinal position being determined by engagement of one end of the billet with the set screw 194. The billet rests rather loosely in position on the two support and pressure members 173 and 193 (FIG. 9), but is held well enough so that it will not fall out of the assembly.

When the billet is to be moved to heating position, the cylinders 163 and 183 are both actuated to impel their piston rods upwardly, driving the two upper bearing plates 166 and 186 up. The billet engages in the V-shaped notches in the electrodes 28 and 38, being driven into intimate contact with the electrodes by the two pressure members 173 and 193. It should be noted that the guide brackets 172 and 192 permit limited lateral movement of the billets, so that they are free to engage the electrodes 28 and 38 in close electrically conductive contact, avoiding arcing that might result if the billets were rigidly held by the support assembly. Once the billet makes contact with the two electrodes it is of course incorporated in the electrical heating circuit. To remove the billet, the cylinders 163 and 183 are again actuated to reverse their movement in a vertical direction, lowering the billet to where it can be conveniently removed.

To accommodate the heating apparatus of billets of different lengths, the racks 111 and 112 can be employed to adjust the relative positions of the front and rear frames, thereby increasing or decreasing the spacing between the individual electrodes in each pair. By the same token, if a separate support bar 118 is used, this can be adjusted longitudinally of the members 111 and 112 to support the free end of the billet if a long billet is required. As is apparent in FIG. 8, it is not essential that the spacing between the electrodes correspond to the billet length, particularly since it may be desirable to heat one end of the billet without heating the other end. Consequently, the billet may project outwardly of the electrode assembly by a considerable length at the front of the heating apparatus, the left-hand side as seen in FIG. 8.

Figure 10:
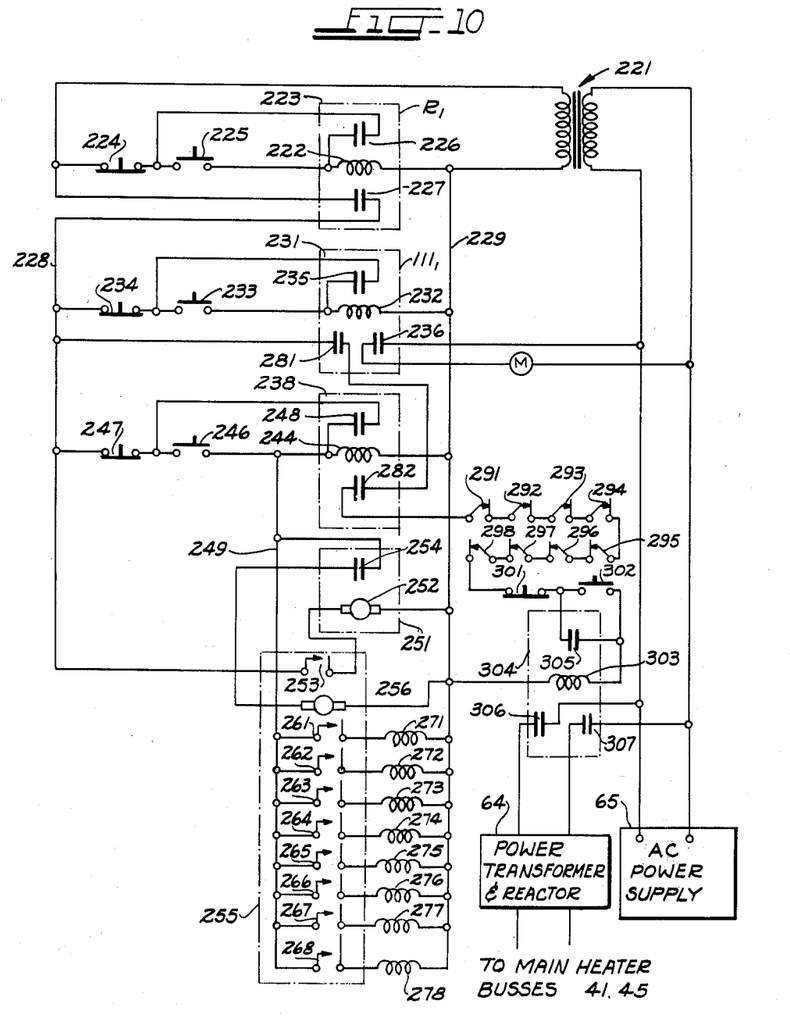
FIG. 10 is a circuit diagram of the electrical control system for the apparatus of FIGS. 4–8.

FIG. 10 illustrates an electrical control circuit capable of performing the functions attributed, in the description of FIG. 3, to the electrical circuits 64–68. In the circuit illustrated in FIG. 10, the A.C. power supply 65 is connected to the primary of a control transformer 221. Across the secondary winding of the transformer 221 there is connected the operating coil 222 of a first control relay 223. A normally closed momentary-action stop switch 224 and a normally open momentary-contact start switch 225 are connected in series with each other and in series with the relay coil 222. The relay 223 includes a pair of normally open contacts 226 that are connected in parallel with the start switch 225. The relay further includes a second pair of normally open contacts 227 that are connected in series with a control bus 228 connected to one side of the secondary winding of the transformer 221. A second control bus 229 is connected to the other side of the secondary winding of the transformer 221.

The control system illustrated in FIG. 10 includes a second relay 231 sometimes referred to hereinafter as the hydraulic control relay. The operating coil 232 of the relay 231 is connected across the control buses 228 and 229 in a circuit that includes, in series, a start switch 233 and a stop switch 234. A pair of normally open contacts 235 in the relay 231 is connected in parallel with the switch 233 to afford a holding circuit for the relay. A second set of normally open contacts 236 in this relay is connected in the operating circuit of a hydraulic motor 237 used to drive a pump to supply fluid under pressure to the operating cylinders of the billet support mechanism such as the support and pressure mechanism 158 described hereinabove in connection with FIGS. 6, 8 and 9. Of course, the motor 237 may well be a three-phase motor of substantial size, which would change the specific electrical connection but the illustrated arrangement for a single-phase motor is adequate to an understanding of the basic operation.

The circuit of FIG. 10 further includes a third relay 238, sometimes referred to hereinafter as the cycle control relay. The operating coil 244 for the relay 238 is connected in an operating circuit that starts with the control bus 229 and extends through a start switch 246 and a stop switch 247, in series, to the bus 228. In addition, the relay 238 is provided with a holding circuit that includes a pair of normally open contacts 248, in the relay, connected from the operating coil 244 to the common terminal of the two switches 246 and 247 to be in parallel with the switch 246. The contacts 248 also provide for continued energization of an auxiliary control bus 249 that is employed to energize the individual billet support devices as described in detail hereinafter.

The control circuit of FIG. 10 includes an automatic reset timer 251 having a motor 252 that is connected across the control buses 228 and 229 in a circuit that includes, in series, a switch 253. The timer motor 252 is used to open a pair of normally closed contacts 254 for a preselected time interval determined by the setting of the timer. The device 251 may be a conventional automatically self-resetting motor-operated timing device; accordingly, there is no need to describe construction of the timer in detail. The contacts 254 are connected in the energizing circuit for a second timer 255, referred to hereinafter as the cycle timer. The cycle timer 255 comprises a motor 256 that actuates the switch contacts 253 and also controls a series of contacts 261–268 which are connected in the operating circuits of a series of solenoids 271–278. There is one set of contacts of the series 261–

268 for each of the billet support mechanisms, such as the mechanism 158 described in detail hereinabove, and there is one solenoid from the series 271–278 for each billet support. Energization of the solenoids is effective to raise the corresponding billet support mechanism, as described more fully hereinafter.

The hydraulic relay 231 includes an additional pair of normally open contacts 281 which are connected in series with a pair of normally open contacts 282 in the cycle relay 238 and in series with the limit switches 291–298. One end of this series circuit is connected to the bus 228, and the other end, following the switch 298, is connected through a stop switch 301 and a start switch 302 to the operating coil 303 of a relay 304, the other terminal of the coil 303 being returned to the second control bus 229. A pair of normally open contacts 305 in the relay 304 are connected across the start switch 302 to afford a holding circuit for the relay. The relay 304 is the main control relay for the electrical heating system of the present invention and comprises two sets of normally open contacts 306 and 307 that are connected between the power supply 65 and the power transformer and reactor unit 64 to control energization of the main heating buses 41 and 45.

In placing the electrical control system of FIG. 10 in operation, the first step is the closing of the main "start" switch 225. When the switch 225 is closed, the operating coil 222 of the relay 223 is energized, closing the contacts 226 and 227. Closing of the contacts 226 establishes a holding circuit that maintains the relay in energized condition. Closing of the contacts 227 completes an operating circuit to the bus 228 to permit effective energization of the other control relays and devices of the system.

After the relay 223 is energized as noted above, the start switch 233 is closed. Closing of the switch 233 completes an operating circuit for the coil 232 of the relay 231, which operates to close the relay contacts 235, 236 and 281. Closing of the contacts 235 establishes a holding circuit for the hydraulic control relay 231. Closing of the contacts 236 completes an operating circuit for the hydraulic pump motor 237 to thereby energize the source of fluid, under pressure, for the hydraulic cylinders that operate the billet support devices, such as the cylinders 163 and 183 shown in FIG. 8. However, energization of the pump motor 237 does not cause the system to supply fluid under pressure to any of the individual operating cylinders, which are controlled by separate solenoid-operated valves actuated by the individual solenoids 271–278.

The next step in the operation of the electrical circuit of FIG. 10 is the closing of the start switch 246. Closing of the switch 246 completes an operating circuit for the cycle control relay 238. As soon as the relay is actuated, the contacts 248 and 282 close. Closing of the contacts 248 establishes a holding circuit for the relay, bypassing the switch 246. Moreover, the auxiliary bus 249 is now electrically connected to the bus 228 to provide for energization of the solenoids 271–278 as described more fully hereinafter. At the same time, the closing of the contacts 248 completes an operating circuit for the cycle timing motor 256, this circuit extending from the bus 228 through the contacts 248 and the normally closed contacts 254 of the timer 251, through the timer motor 256 to the bus 229. The timing device 255 actuates all of the cam switches 261–268 in predetermined sequence to energize the solenoids 271–278 in timed relation to each other as explained in connection with FIG. 10A.

Finally, to establish the heating system in operation, it is necessary for the operator to close the heater start switch 302. Closing of the switch 302 is effective to complete an operating circuit for the coil 303 of the heater control relay 304. This circuit extends from the bus 229 through the coil 303, the switches 302 and 301, the limit switches 291–298, the contacts 282 of the cycle relay 238, the contacts 281 of the hydraulic relay 231, and thence to the other bus 228. It is thus seen that the relays 231 and 238 must be energized before the heater control relay 304 can be actuated; this is done in order to make sure that the cycling mechanism is fully operative before the main circuit is completed. When the relay 304 is energized, the contacts 305 close to complete a holding circuit for this relay. In addition, the contacts 306 and 307 are closed, completing an operating circuit for the power transformer and reactor 64 from the main power supply 65.

Figure 10A:
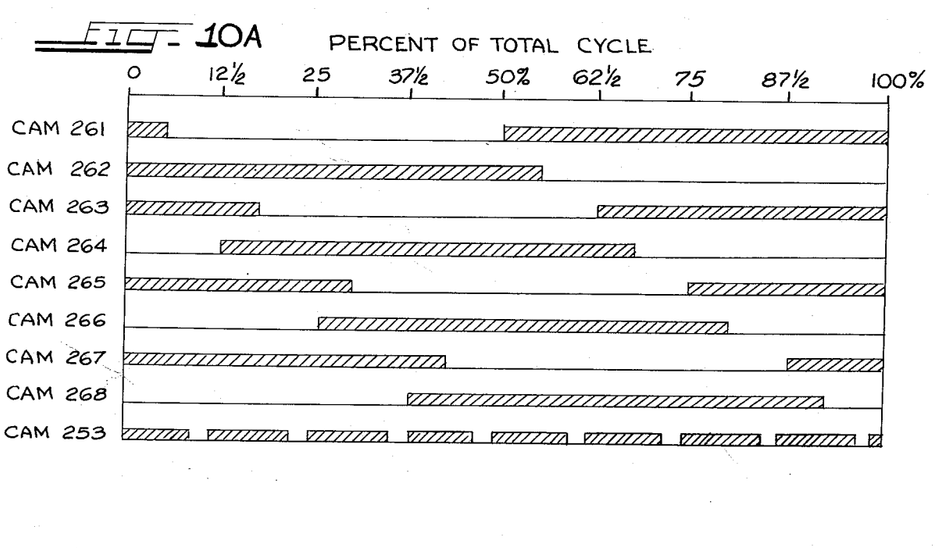
FIG. 10A is a timing diagram used to explain operation of the circuit of FIG. 10.

FIG. 10A illustrates the timing sequence for the cam switches 253 and 261–268 that are actuated by the timing device 255. As shown in FIG. 10A, the cam switch 261 is closed during a time interval that is slightly in excess of one-half of each operating cycle. During most of the time that the cam switch 261 is closed, the cam switch 262 is open. However, switch 262 is closed shortly before switch 261 opens. Thus, when the time comes for the switch 261 to open to de-energize the solenoid 271 and permit the lowering of the first billet support 51 (FIG. 1) the cam switch 262 first closes to energize the solenoid 272 and supply fluid under pressure to the hydraulic mechanism that elevates the billet support 52. It is thus seen that the requisite shunting action described above for the addition of a new billet in the heating system prior to the removal of a heated billet, with the new billet electrically parallel with the old billet, is carried out under control of the cam switches 261–268.

The cam switch 253 and the auto re-set timer 251, provide for adjustment of the total cycling time and, therefore, for adjustment of the heating time for each billet. The switch 253 closes for a short interval a total of eight times during each operating cycle. When this switch closes, the timer 251 is set in operation, opening the contacts 254 and thus interrupting actuation of the main cycle timer 255. The contacts 254 are not held open indefinitely, but are opened for a relatively short predetermined period, depending upon the setting of the automatic reset timer 251. Subsequently, the contacts 254 re-close, again energizing the timer 255. Thus, the auto re-set device 251 provides an adjustable means for determining the total heating time for the billets without requiring re-setting of the cam-actuated switches 261–268 or a change in the operating speed of the main timer motor 256.

If the cycle stop switch 247 is opened, the bus 249 is de-energized. Accordingly, all of the solenoids 271–278 are de-energized, permitting the hydraulic actuating mechanisms for the billet supports to drop the billets from engagement with the heating electrodes. The main cycle timer 255 also drops out. The cycling mechanism can subsequently be adjusted to the start of a cycle by closing the switch 246 to energize the timer 255 without closing switch 302.

The limit switches 291–298 are utilized to protect the heating system against engagement of the support members for the billets with the electrodes. Thus, if the system operator neglected to re-fill a billet holder after removing a billet from the system, the billet support member might move upwardly into engagement with the electrical contact at that position. This would be most undesirable in view of the large electrical currents available at the electrodes. Consequently, if any billet support moves above a predetermined level the associated limit switch opens, breaking the operating circuit to the power transformer and reactor 64 by energizing the operating coil 303 of the relay 304. It is thus seen that the limit switches comprise a sensing means for making sure that a billet is present in any billet holder that moves upwardly toward heating position.

Figure 11:
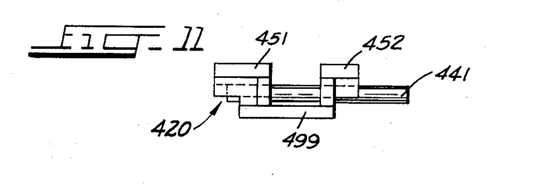
FIG. 11 is a simplified schematic end elevation view, similar to FIG. 1, of another embodiment of the invention.
Figure 12:
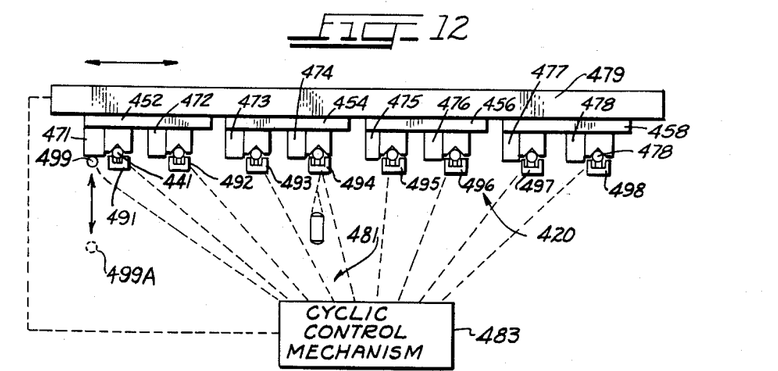
FIG. 12 is an end elevation view of the apparatus of FIG. 11.
Figure 13:
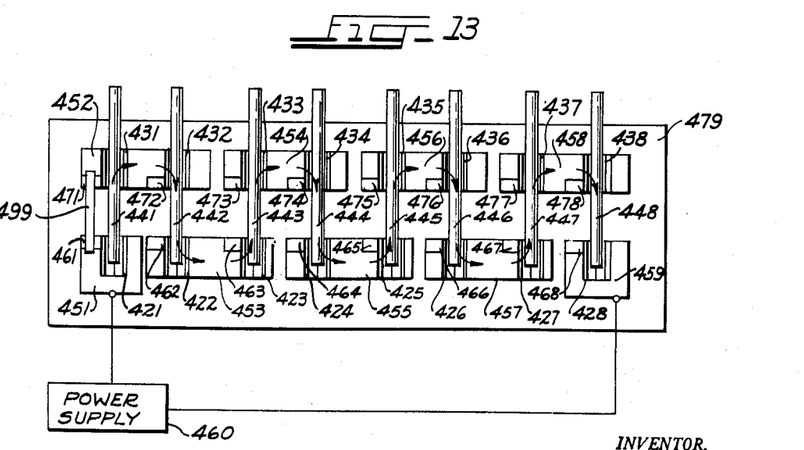
FIG. 13 is a schematic simplified illustration of the current paths for the apparatus of FIGS. 11 and 12 and comprises, essentially, a bottom view of the apparatus of FIG. 11.

FIGS. 11–13 illustrate a resistance heating apparatus constructed in accordance with another embodiment of the invention; the apparatus 420 shown in these figures may also be utilized for the heating of billets in a forging operation or in other similar applications. As in the previous embodiments, the resistance heating apparatus 420 includes eight individual sets of electrodes, each set including two electrodes. As shown in FIG. 13, the first set of electrodes includes the electrodes 421 and 431 located at the left-hand side of the figure, the final set of electrodes being designated by the reference numeral 428 and 438. Moreover, each of the individual electrodes, as in the first embodiment, preferably comprises a V-shaped contact portion for engaging a billet or other workpiece. In FIGS. 12 and 13, billets are shown in heating position in each of the electrode pairs, the billets being designated by reference numerals 441–448.

The electrical bus arrangement for the embodiment of FIGS. 11–13 is different from that in the system 20 of FIGS. 1–3. Thus, the electrode 421 is connected to a first bus 451 that does not include any additional billet-heating electrode connections. The electrodes 431 and 432 are mounted upon a common electrical bus 452, the electrodes 422 and 423 are mounted upon a bus 453, the electrodes 433 and 434 are connected to a bus 454, and the electrodes 424 and 425 are mounted upon an electrical bus 455. The two-electrode-per-bus pattern is carried out through the buses 456, 457 and 458, the final bus for the system being the member 459 which carries only the individual billet-contact electrode 428. The two end buses of the system, the members 451 and 459, are connected to a suitable power supply 460.

In addition to the billet-heating electrodes 421–428 and 431–438, an additional set of eight pairs of electrodes is provided in the system 420 of FIGS. 11–13. These additional electrodes are paired in correspondence with the electrodes 421–428 and 431–438. These electrodes comprise the members 461–468, which are individually associated with an electrically common with the electrodes 421–428. Similarly, the electrodes 471–478 are associated on a one-for-one basis with, and are electrically connected to, the electrodes 431–438. In the illustrated construction the entire electrical assembly, comprising all of the bus bars and electrodes, is mounted upon a suitable support member 479, which is electrically insulated from all of the buses and, accordingly, from all of the electrodes.

The heating system 420 further includes a transfer station 481 that is illustrated in FIG. 12. The transfer station 481 comprises a temperature-sensing device 482 positioned to detect the temperature of the billet 441 when this billet is located in alignment with the device 482. The temperature sensing device 482 is connected to a cyclic control mechanism 483 that includes suitable electrical and mechanical control means for moving the support member 479 relative to the transfer station 481 in a predetermined sequence of movements set forth in detail hereinafter. The control mechanism 483 comprises means for determining the critical temperature at which a transfer movement shall be made and also includes programming means for establishing the desired sequence of movement. The mechanism 483 further includes means for automatically actuating each of a plurality of billet holders 491–498 between a heating position in which the holder maintains one of the individual billets 441–448 in heating position, as shown in FIG. 12 and 13, and a discharge position displaced from the heating position to permit unloading and loading of the billets. This portion of the apparatus may be mechanically similar to the billet support devices described hereinabove in connection with the system of FIGS. 1–10. The control mechanism 483 further includes means for actuating a shunt member 499 between a contact position, as shown in FIG. 12, and a disengaged position 499A, as described more fully hereinafter.

In operation of the system 420 of FIGS. 11–13, unlike the system 20 of FIGS. 1–3, all of the electrode positions are utilized simultaneously for billet heating. That is, in the course of normal operation, all of the billets at the positions 441–448 are held in contact with the associated pairs of electrodes 421–428 and 431–438. As seen in FIG. 13, this affords a complete series electrical circuit beginning at the bus 451 and extending through the electrode 421, the billet 441, the electrode 431, the bus 452, and all of the other billets in series, taking in all of the other electrode pairs and buses, and ending with the final bus 459.

In starting of the system 420, there is a certain amount of lost time, just as in the case of the previously described embodiment. In considering initiation of operation, it may be assumed that all billet positions are occupied, as shown in the drawings, with a complete heating circuit established through all of the billets 441–448. An approximate heating cycle time having previously been established, the apparatus is maintained in the condition shown, but with the shunt 499 moved to the alternate position 499A out of the circuit, for a period equal to approximately ⅛ of a normal heating cycle. At the end of that time, the support member 479 is moved relative to the transfer station 481 to bring a new billet to the transfer station. Just prior to this movement, however, the shunt member 499 is momentarily moved to the operating position shown in solid lines in FIG. 12, thereby shunting the billet 441. This billet is removed, and a new billet is placed at the position 441. Immediately after the transfer, the support member 479 moves to bring the next billet to the transfer station. This movement could position the billet 442 at the transfer station; preferably, however, with the arrangement illustrated, the movement brings the billet 443 to the transfer position.

After the initial transfer operation and sequence movement, heating is continued for approximately ⅛ cycle. A second billet exchange operation is then carried out, the billet 443 being removed and replaced. Before the billet is removed, the shunt 499 is moved into engagement with the shunt-engaging electrodes 463 and 473 that are aligned with the billet position 443. The shunt is, of course, removed to its disengaged position after replacement of the billet, and the member 479 is then actuated to bring the next heating position, that of the billet 445, to the transfer station 481. This procedure is repeated a total of seven times, the billet positions aligned with the transfer station 481 proceeding in the following sequence: 441, 443, 445, 447, 448, 446, 444, 442. After the transfer has been completed at the station 42, the apparatus ends up in the position illustrated in FIGS. 12 and 13.

Following the complete sequence of initial operations as outlined above, the billet at the position 441 has been in the heating circuit for approximately ⅞ of a normal heating cycle. With continued heating, the temperature reaches a desired forging temperature, being continuously monitored by the device 482. When forging temperature is reached, the control mechanism 483 is actuated to move the shunt member 499 from its retracted position 499A to the transfer position 499. The billet support 491 is then retracted, the heated billet is removed and is immediately replaced by a new billet moved into heating position in contact with the electrodes 421 and 431. The shunt 499 is then moved out of contact with the electrodes 461 and 471 and a transfer movement of the support member 479 is effected to bring the next billet in the sequence, the billet 443, into the transfer position. This billet is heated to completion, as sensed by the device 482. The shunt 499 is then moved into effective position, the billet is replaced, and a new billet is quickly incorporated in the heating system. The shunt is again retracted, and the next transfer movement takes place, bringing the billet position 445 into alignment with the transfer station. Thus, the process can be carried on continuously from this point, with each billet being heated to the precise desired temperature as determined by the sensing device 482. Accordingly, it is seen that this embodiment of the invention operates in a manner analogous to that of the first embodiment except that a separate shunt member, member 499, is utilized to keep the heating circuit in continuous operation, despite the fact that it is a series circuit. Furthermore, the thermal control or monitoring element 482 of the system 420 provides for direct temperature control with respect to the heating of all billets.

Of course, it is not necessary to follow the particular sequence described above, with respect to billet transfer. The transfer arrangement suggested herein, in which the transfer movement skips adjacent heating positions, is most useful when the billets are aligned on a planar or arcuate support. If disposed in a complete circular array, however, it would be more desirable to bring the billets to the transfer station in a sequence taking, in each instance, the next adjacent billet in order to avoid any necessity for reversing the direction of movement of the support member. Of course, it will be recognized that it is not essential that the transfer apparatus 481 remain stationary and the billets and heating electrodes be shifted in their positions. Instead, that portion of the transfer mechanism comprising the shunt 499 and the sensing device 482 could be caused to move while retaining the electrical heating apparatus and the billet supports stationary.

From the foregoing description, it can be seen that both embodiments of the present invention afford an effective and efficient resistance heating apparatus suitable for use in heating billets to forging temperature and in like applications. The invention makes it possible to heat relatively large quantities of billets or other workpieces in a minimum time using a minimum of electrical capacity insofar as the heating equipment is concerned. Arcing is reduced to a minimum, contact welding and pitting are minimized, and inductive surges are substantially eliminated in the system afforded by the invention. As a consequence, maintenance is kept to a minimum and operation is inherently economical, particularly because of the high power factor provided by the heating equipment.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A resistance heating apparatus for heating billets or like workpieces to forging temperature comprising: a plurality of $n$ pairs of electrodes, each pair including a first electrode and a second electrode, each electrode pair being adapted to engage a billet at spaced points to pass a heating current therethrough; electrical connector means connecting the first electrodes of the first two pairs together, connecting the second electrodes of the first four pairs together, connecting the first electrodes of pairs three through six together, connecting the second electrodes of pairs five through eight together, and continuing this connection sequence to termination with the interconnection of the first electrodes of pairs $n$ and $n-1$; support means for supporting billets in engagement with said electrode pairs to complete an electrical heating circuit with one-half of said electrode pairs in series with each other across a power supply; and means for automatically moving a new billet to heating position, shunting any given pair of electrodes, when the billet engaged by said pair has reached forging temperature, to permit replacement of the billet in the series circuit and subsequent removal thereof without interruption of the heating of the other billets.

2. A resistance heating apparatus for heating workpieces to working temperature comprising: a plurality of sets of electrodes, each set adapted to engage a workpiece at spaced points to pass a heating current therethrough; electrical connector means connecting a predetermined number of said electrode sets in series with each other across a power supply; fluid-pressure operated workpiece holding means for releasably holding a plurality of workpieces in engagement with said electrodes under substantial pressure to complete a heating circuit through said workpieces; a cyclic control means for actuating said holding means in accordance with a predetermined sequence to stagger the heating of the workpieces and afford a regular progression of workpieces heated to working temperature; and means for bridging any given set of electrodes, when the workpiece engaged thereby has reached forging temperature, to permit removal and replacement of the workpiece without interruption of the heating of other workpieces by the remaining sets of electrodes serially connected to said given set.

3. A resistance heating apparatus for heating workpieces to working temperature comprising: a plurality of sets of electrodes, each set adapted to engage a workpiece at spaced points to pass a heating current therethrough; electrical connector means connecting a predetermined number of said electrode sets in series with each other across a power supply; workpiece holding means for releasably holding a plurality of workpieces in engagement with said electrodes to complete a heating circuit therethrough; cyclic control means for actuating said holding means in predetermined sequence to heat the workpieces to working temperature in a regular progression; and means for bridging any given set of electrodes, when the workpiece engaged thereby has reached forging temperature, to permit removal and replacement of the workpiece without interruption of the heating of other workpieces by the remaining set of electrodes serially connected to said given set.

4. A resistance heating apparatus for heating workpieces to working temperature comprising: a plurality of sets of electrodes, each set adapted to engage a workpiece at spaced points to pass a heating current therethrough; electrical connector means connecting a first predetermined group of said electrode sets in series with each other across a power supply, said connector means further connecting a second group of sets of electrodes individually in parallel with respective ones of said first group; workpiece holding means for releasably holding a plurality of workpieces in engagement with said electrodes to complete a heating circuit therethrough; cyclic control means for actuating said holding means in predetermined sequence to heat the workpieces to working temperature in a regular progression; and means for shunting each workpiece, when it has reached forging temperature, to permit removal and replacement of the workpiece from an electrode set of one group without interruption of the heating of other workpieces by engaging another workpiece in the parallel set of electrodes of the other group.

5. A resistance heating apparatus for heating billets or like workpieces to forging temperature comprising: a plurality of pairs of electrodes, each pair adapted to engage a billet at spaced points to pass a heating current therethrough; electrical connector means connecting all of said electrode pairs in series with each other across a power supply; workpiece holding means for releasably holding a plurality of workpieces in engagement with said electrodes to complete a heating circuit therethrough; cyclic control means for actuating said holding means in predetermined sequence to heat the workpieces to working temperature in a regular progression; a conductive shunt member; and means, included in said cyclic control means, for automatically sequentially connecting said shunt member across said pairs of electrodes, when the billets engaged thereby reach forging temperature, to permit removal and replacement of the billets without interruption of the heating of the other billets in the remaining electrodes.

6. A resistance heating apparatus for heating billets or like workpieces to forging temperature comprising: a plurality of $n$ pairs of electrodes, each pair including a first electrode and a second electrode, each electrode pair being adapted to engage a billet at spaced points to pass a heating current therethrough; electrical connector means connecting the first electrodes of the first two pairs together, connecting the second electrodes of the first four pairs together, connecting the first electrodes of pairs three through six together, connecting the second electrodes of pairs five through eight together, and continuing this connection sequence to termination with the interconnection of the first electrodes of pairs $n$ and $n-1$; support means for supporting billets in engagement with said electrode pairs to complete an electrical heating circuit with one-half of said electrode pairs in series with each other across a power supply; cyclic control means for automatically moving a new billet to heating position, shunting any given pair of electrodes, when the billet engaged by said pair has reached forging temperature, to permit replacement of the billet in the series circuit and subsequent removal thereof without interruption of the heating of the other billets; and means, included in said control means, for periodically monitoring billet temperature to compensate for variations in the heating rate of the apparatus.

References Cited in the file of this patent

UNITED STATES PATENTS

| | | |
|---|---|---|
| 438,657 | Thomson | Oct. 21, 1890 |
| 486,176 | Burton et al. | Nov. 15, 1892 |
| 532,838 | Thomson | Jan. 22, 1895 |
| 1,323,751 | Geisenhoner | Dec. 2, 1919 |
| 1,394,891 | Geisenhoner | Oct. 25, 1921 |
| 1,406,550 | Geisenhoner | Feb. 14, 1922 |
| 1,650,943 | Jones | Mar. 19, 1927 |